United States Patent [19]

Babcock et al.

[11] Patent Number: 4,839,115

[45] Date of Patent: Jun. 13, 1989

[54] METHODS FOR FORMING SHAPES OR BLOCKS OF NO MIX CEMENTS

[75] Inventors: H. Nash Babcock, Old Greenwich; Edward P. Holub, Bethel, both of Conn.

[73] Assignee: Nomix Corporation, Fairfield, Conn.

[21] Appl. No.: 101,908

[22] Filed: Sep. 28, 1987

Related U.S. Application Data

[60] Division of Ser. No. 53,561, May 21, 1987, Pat. No. 4,732,782, which is a continuation-in-part of Ser. No. 843,316, Mar. 24, 1986, abandoned.

[51] Int. Cl.$^4$ .................. B28B 1/14; B29C 39/02
[52] U.S. Cl. ................... 264/42; 264/109; 264/122; 264/219; 264/299; 264/333; 264/334
[58] Field of Search ............... 264/333, 109, 122, 42, 264/DIG. 43, 240, 219, 299, 334; 427/427, 180, 181, 140, 136, 403, 397.7; 52/742; 405/266, 267, 222–224; 106/85, 89, 97

[56] References Cited

U.S. PATENT DOCUMENTS

| | | | |
|---|---|---|---|
| 188,123 | 3/1877 | Goodridge, Jr. | 405/222 |
| 358,853 | 3/1887 | Goodridge, Jr. | 405/222 |
| 743,525 | 11/1903 | Lake | 264/DIG. 43 X |
| 1,391,678 | 9/1921 | Francois . | |
| 3,582,376 | 6/1971 | Ames | 106/90 |
| 3,665,720 | 5/1972 | Havno | 405/226 |
| 3,683,760 | 8/1972 | Silva | 264/333 X |
| 3,730,763 | 5/1973 | Schlottmann et al. | 427/427 |
| 3,745,775 | 7/1973 | Kahn | 405/222 |
| 3,914,359 | 10/1975 | Bevan | 264/DIG. 43 X |
| 3,922,832 | 12/1975 | Dicker | 52/742 |
| 3,927,163 | 12/1975 | Gabriel et al. | 264/DIG. 43 X |
| 4,042,407 | 8/1977 | Natsuume | 106/90 |
| 4,129,449 | 12/1978 | Kujima | 405/266 |
| 4,366,209 | 12/1982 | Babcock | 427/180 |
| 4,367,986 | 1/1983 | Miyoshi et al. | 405/266 |
| 4,374,672 | 2/1983 | Funston et al. | 106/97 |
| 4,390,372 | 6/1983 | Hardin | 106/90 |
| 4,461,856 | 7/1984 | Willis et al. | 523/401 |
| 4,487,633 | 12/1984 | Sakuta et al. | 106/90 |
| 4,504,315 | 3/1985 | Allemann et al. | 106/89 |

FOREIGN PATENT DOCUMENTS

| | | | |
|---|---|---|---|
| 1234192 | 5/1986 | U.S.S.R. | 264/333 |

OTHER PUBLICATIONS

Y. Nakahra, N. Kurumada, T. Arai and I. Uesugi, "The Prepacked Concrete in Water, Using Artificial Extremely Fine Sand", The Cement Assoc. of Japan, Review of the Twenty-Seventh General Meeting Technical Session, pp. 199–201 (May 1973).
Sakrete®, Save with Sakrete Products Brochure (4 pages).
Sakrete®, 15 Easy Steps to Greater Home Enjoyment Booklet (3 pages).
Quikrete®, Handyman . . . Complete Guide to Home Maintenance (4 pages).
Quikrete®, Do It Yourself Projects with Cement Mixes Brochure (2 pages).
Quikrete®, Do-It-Yourself Series on Wet or Leaking Basement Walls (2 pages).
Sakrete 50th Anniversary Brochure (1986).
Quikrete, Package Pavement Company, Quikrete®, Do-It-Yourself Series, Setting Posts & Mixes and Their Uses (3 pages).

*Primary Examiner*—Jan H. Silbaugh
*Assistant Examiner*—Karen D. Katach
*Attorney, Agent, or Firm*—Pennie & Edmonds

[57] ABSTRACT

A method for molding a cementitious composition into an article having a desired shape or configuration by preparing a mold in a predetermined shape or configuration corresponding to the desired shape or configuration of the article, substantially filling the mold with water to provide a substantial excess of that needed for hydration of the cementitious composition which will be used to make the article, introducing into the water in the mold a dry cementitious composition in the form of finely divided particles of at least one cement binder in an amount of greater than 20 percent by weight of the composition, the major proportion of the particles having approximately the same drop rate, by pouring the composition into the water without any type of physical mixing of the cementitious composition and the water other than the mixing which occurs when the composition becomes completely hydrated by combining with a portion of the water and displacing excess water, if any, from the mold, and allowing the hydrated cementitious composition to set or cure to a self supporting solid in the desired shape or configuration.

27 Claims, No Drawings

METHODS FOR FORMING SHAPES OR BLOCKS OF NO MIX CEMENTS

CROSS REFERENCE TO RELATED APPLICATION

This application is a divisional of application Ser. No. 53,561, filed May 21, 1987, issued on Mar. 22, 1988 as U.S. Pat. No. 4,732,782, which application is a continuation-in-part of application Ser. No. 843,316, filed Mar. 24, 1986, now abandoned.

TECHNICAL FIELD

The present invention relates to methods and compositions for the application or placement of cementitious compositions which do not require premixing with water.

BACKGROUND OF THE INVENTION

At present, it is essential that all cementitious compositions are mixed with water before placement in order to obtain the proper characteristics of the final product. Some type of mixing is and has always been required. Some manufacturers of premixes have put the dry premix in a hole and then recommended adding the water. Some have put premixes in bags and dropped the mixes while in bags through the water, then after the bags are in place, letting water penetrate through the bag to the mix. However, these systems have not allowed full hydration. Mortar mixers, concrete mixers, hand mixing or other types of wet mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or on to a wet surface without first wetting and mixing the dry components.

SUMMARY OF THE INVENTION

The present invention relates to dry cementitious compositions which have finely divided particles of at least one cement binder. The cement may be Portland cement, gypsum, high aluminum cement, or mixtures thereof, but not restricted thereto. Magnesium phosphate or other fast-setting compounds may also be used. The major proportion of particles have approximately the same drop rate in water, so that when poured through water according to the invention, the material does not appreciable segregate.

These compositions may further include a filler component of sand or aggregate particles, provided that the major portion of those particles have a drop rate in water which is approximately the same as the cement particles. Also, the cementitious mixture should be able to absorb and/or combine with water in the amount approximating 50% by volume. The higher the amount of water the cementitious mixture can tolerate, the better the finished product.

It is possible to use other additives in these compositions. Such additives may include, but are not limited to, accelerators, water reducing compounds, pumping aids, water absorbing compounds, waterproofing agents, polymers, drying shrinkage inhibitors, wet shrinkage inhibitors, lime, pigments and the like, and may be added to improve or impart a particular property to the composition.

The invention also relates to a method for making these compositions. These methods include providing the cement binder in the form of finely divided particles and adjusting the drop rate of the major portion of particles to approximately the same range. Filler components, if added, are treated the same. When fillers are added, it is preferable to mix the dry ingredients to a homogeneous consistency.

The invention also contemplates various methods for installing cement products upon a substrate which comprises saturating the substrate with an amount of water which is substantially in excess of the normal amount of dry components which are subsequently added. The dry powder is added without mixing in a manner such that it combines with a portion of the water and displaces the remainder of the water. The applied combination is then allowed to cure to a final product.

The present invention also relates to a method for molding a cementitious composition into an article having a desired shape or configuration which comprises preparing molding means in a predetermined shape or configuration corresponding to the desired shape or configuration of the article; substantially filling the molding means with water to provide a substantial excess of that needed for hydration of the cementitious composition which will be used to make the article; introducing into the water in the molding means a dry cementitious composition in the form of finely divided particles of at least one cement binder in an amount of greater than 20 percent by weight of the composition, the major proportion of the particles having approximately the same drop rate, by pouring the composition into the water without any type of physical mixing of the cementitious composition and the water other than the mixing which occurs when the composition is poured into the water, such that the cementitious composition becomes completely hydrated by combining with a portion of the water and displacing excess water, if any, from the molding means; and allowing the hydrated cementitious composition to set or cure to a self supporting solid in the desired shape or configuration.

In one aspect, the holding means comprises mold means configured to form a predetermined shape and the set or cured composition is removed from the mold means in the form of the predetermined shape. Alternately, the holding means comprises temporary mold means configured to form a predetermined shape and the temporary mold means can be removed to obtain the set or cured composition in the predetermined shape.

Specific methods are presented herein below.

DETAILED DESCRIPTION OF THE PREFERRED EMBODIMENTS

The invention relates to dry cementitious compositions which are poured, troweled or sprayed through excess water or onto wet surfaces without mixing to hydrate the cement component and obtain high strength products after setting and curing. Cementitious compositions of Portland cements, gypsums, high alumina cements, other specialty cements and combinations, as well as other chemicals such as magnesium phosphates, all have been successfully used, the only limitation being that at least one component of the cementitious composition is hydrated by or reacts with water.

When the formulations of these cementitious compositions are properly controlled, the problems of thorough wetting of the cement without overwetting, of segregation of components, and of loss of compressive strength of the cured product are greatly reduced or eliminated.

Where cement coatings are desired, the surface area to be coated is first prewetted and saturated with water. The dry cementitious mixture is placed on the surface, instantly reacting with the wet surface. If additional layers or a greater thickness of the coating is needed, the first cement layer can be prewetted and the dry composition sprayed directly thereupon to increase the thickness and structural strength of the overall coating.

On horizontal surfaces, the area to be poured with cement is first flooded with water, then the dry cementitious compositions of the invention can be poured into the water. The excess water is displaced by the cementitious composition, and the composition is then allowed to cure. This provides a fast, simple installation of cement without the need for tools, mixing apparatus, water measurement aids or the like. For floor levelings, for example, the floor can be flooded to form puddles in low areas. The dry cementitious composition is then sprinkled in the areas where puddles are formed, and allowed to cure. Thus, the floor is easily levelled by this procedure.

Controlling the rate of hydration may lead to many applications. For instance, for coating vertical surfaces, a very fast setting material can be used to eliminate the problems of running, sagging or failure to bond. Where mortar for bricklaying is desired, a material with a longer set time will allow the operator sufficient time to work with the material. For situations where the surface particles have not been properly wetted, additional water may be applied to the surface for more activation and further finishing.

In the past, there has always been difficulty in controlling the amount of water for the patching of highways or other horizontal surfaces. This problem is solved by this invention because the amount of water is controlled by the formulation of the dry cementitious composition itself. For example, water can be placed into a footing, post hole, mortar joint or tub, or pothole and then the dry cementitious material may be placed by pouring, spraying, or screening into the cavity until the desired level is reached. Excess water, if present, is displaced from the hole by the dry material. The rate of setting of the cementitious mixture can be designed to meet the needs of the particular application. The amount of water required depends on the specific composition and application used.

For the placement of concrete foundations, a hole is first prepared, then filled with the required amount of water. If desired, forms can be used to help contain the water. The dry material can be then poured directly into the foundation area to the desired height, thus displacing the excess water, if any. After the material cures, the foundation is complete.

In certain circumstances, a cavity could have a small percentage of water placed into it and then the first part of the cementitious mixture placed into the water. While this placement is taking place, additional water could then be placed into the hole by various methods simultaneously with the placement of the rest of the cementitious mixture. When the final quantity of cementitious mixture is reached, the entire surface area could be sprayed for troweling or other finishing purposes as could be done when the entire mixture is poured through water.

In the situation where the cavity is porous and cannot hold water, it is possible to thoroughly wet the surfaces of the hole and then introduce a fast setting cementitious mixture. It is then possible to fill the lined hole with water and proceed as above.

The control of density and size of the dry components and the rate of drop through water is essential for the proper performance of the cementitious mixtures. The ability to use materials of various sizes and densities, whose drop rate would otherwise be higher if a slow setting cementitious mixture was used, is enhanced by the increased rate of the water activation of the cementitious particles to form a homogeneous mixture. The most advantageous formulations include those wherein substantially all the particles have substantially the same drop rate.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. In this manner, masonry walls can be built up with dry mortars which are hydrated after installation. Precast and prestressed sections are put in place, the dry mixture is placed in water in the joints and the surface can be wetted down for complete activation of the cement binder. The setting time of the binders can be accelerated to a few seconds or slowed up for days, depending upon the selection of cement component.

The invention also contemplates forming blocks or shapes of no mix cements by forming a temporary or permanent mold, filling the mold with water, and adding the no mix cements in the manner described previously. After the cementitious material has set or is cured, it can be removed from the mold. In the case of large shapes, the mold can be removed after the material has set or is cured.

Molds can be made out of various types of molding materials in use today, such as cement, gypsum, wood, plastic, metal, etc. These molds can be shaped to form a multitude of cement or concrete blocks and block styles used for building construction or walkways, slabs, both structural and nonstructural, precast sills, steps, lintels and many other shapes needed in construction, including precast columns, beams, girders, pretensioned structural members of all types, and post-tensioned structural members of all types. Also, by properly forming the mold, it may be used many times over, by filling the mold with water, and pouring therein the cementitious composition rather than mixing the cementitious composition previously with water or moisture and then placing it in a container.

The mold can be made of a single or multiple piece sections, the only requirement being that it is capable of retaining water for a sufficient time to allow the dry components to be added thereto.

This procedure eliminates the conventional steam curing methods of making concrete or lightweight blocks, bricks, elaborate equipment, vibrating and other treatments used in the manufacture of premolded materials. For many types of applications, the molds used may be fabricated from multiple sections (as described above) made from a plastic material so that house builders, consumers and even those engaged in commercial construction projects can cast all of the necessary materials on-site.

The setting time for the dry mixes referred to above can be increased considerably over that normally used with the present procedures of mixing the cement products with water before placement. Very fast formulations of cementitious compositions may be used because there is no reason to delay for the various procedures presently in use. Blocks, precast members, etc. can all be cast and set and stripped out of the mold within minutes.

Precasting and pouring cementitious matrices through water eliminates damage from handling, storage and shipping, which occurs with present manufactured precast products, because manufacturing can now be done at the job site with no waste in materials or damage loss.

If lightweight blocks or shapes are desired, foaming or blowing agents or agents which generate large amounts of gases can be added to the dry composition. Then upon addition of the dry composition to the water in the mold, these agents generate gases which provide porosity and light weight properties to the blocks or shapes.

These blocks or shapes can be prepared in the shops or at the jobsite. Since the materials cures fairly rapidly, blocks made on one day could be installed one day later. As noted above, when formed at the jobsite, breakage or damage due to shipment of the blocks is substantially reduced and minimized. Also, shipping costs are reduced since only the dry mixture has to be delivered.

The system can be used with any normal additives acceptable to the specific composition. In some compositions, no curing agent is required. Furthermore, the compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives or modifying agents can be added to the water or to the cement mix, in any order or combination.

The examples show the success of adding cementitious compositions to water after the water is in place.

When dry, preblended materials are used, there is a much greater potential for higher quality finished product.

If aggregates are found to be too heavy, smaller aggregates or lighter weight aggregates can be used to keep the density of the overall system in balance.

The present invention provides the following:
1. Dry cement can be used.
2. Cement and sand can be used.
3. Cement, sand and aggregates can be used.
4. All types of cements can be used.
5. All types of cementitious particles, such as gypsums, limes and so fourth can be used.
6. All types of chemical cements, even with water soluble parts, can be used.
7. No wet mixing or blending equipment is required.
8. No addition of water to mixes is required before placement, avoiding all equipment costs and clean up.
9. When placements under deep water conditions where tremes, elephant trunks or pipes would be required, the material under this formula can be placed dry in the tube and activated by available water at the end of the line, thus keeping all conveyances clear of wet cement.
10. When cement contents are too low in mixtures to permit proper strength development or prevent overadsorption of water, resulting in weak or segregated mixes, more cement may be added, or water absorption material may be added, to prevent excess water from decreasing the quality of the mix.

Present cement mixes with less than 20% by weight of a cementitious binder should have some additional water absorption agent in the mix to prevent overwatering and segregation. Ideally, cementitious compositions of the mixtures should have the maximum amount of water absorbency possible. The higher the ratio of chemically bonded water to the binder, the better and more versatile a product will be achieved.

Cementitious mixtures containing more than 20% by weight cement may or may not need additional cement or water absorbers, depending on the application.

While using liquids other than water, such as two component thermosetting organic compounds, an aggregate or sand can be dropped through the liquid or chemicals, causing the final mixture to be blended by gravity or by the solid ingredients passing through the liquid, which will result in a hardened mass of aggregate or sand and chemical.

EXAMPLES

The scope of the invention is further described in connection with the following examples which are set forth for the sole purpose of illustrating the preferred embodiments of the invention and which are not to be construed as limiting the scope of the invention.

The first 9 of the following examples are cementitious materials that were poured into a 4"×8" cylinder which was filled with water. The material was poured until it reached a level of about ½" below the top of the cylinder. The cementitious material was then allowed to cure. The results are described in Table I.

EXAMPLE 1

| Substance (common sand/cement mix) | Percentage |
|---|---|
| Portland Cement Type I | 20% |
| Sand | 80% |

Set time is 20 hours.
Compressive strength at 24 hours is 0.0 psi (too little cement).

EXAMPLE 2

| Substance | Percentage |
|---|---|
| Portland Cement Type I | 90% |
| Sand | 10% |

Set time 12 hours.
Compressive strength at 24 hours is 1,100 psi.

EXAMPLE 3

| Substance | Percentage |
|---|---|
| Portland Cement Type I | 50% |
| Sand | 50% |

Set time 16 hours.
Compressive strength at 24 hours is 600 psi.

EXAMPLE 4

| Substance | Percentage |
| --- | --- |
| Portland Cement Type I | 50% |
| Pea Gravel | 50% |

Set time 16 hours.
Compressive strength at 24 hours is 0.0 psi. (different drop rates).

EXAMPLE 5

| Substance | Percentage |
| --- | --- |
| Portland Cement Type II | 50% |
| Plaster of Paris | 50% |

Set time is 10 minutes.
Compressive strength at 24 hours is 1,600 psi.

EXAMPLE 6

| Substance | Percentage |
| --- | --- |
| High Alumina Cement | 80% |
| Sand | 20% |

Set time is 12 hours.
Compressive strength at 24 hours is 1,100 psi.

EXAMPLE 7

| Substance | Percentage |
| --- | --- |
| High Alumina Cement | 20% |
| Sand | 80% |

Set time is 20 hours.
Compressive strength at 24 hours is 0.0 psi. (too little cement).

EXAMPLE 8

| Substance | Percentage |
| --- | --- |
| High Alumina Cement | 25% |
| Portland Cement Type III | 25% |
| Lithium Carbonate | 1% |
| Sand | 49% |

Set time is 5 minutes.
Compressive strength at 24 hours is 1,100 psi.

EXAMPLE 9

| Substance | Percentage |
| --- | --- |
| Magnesium Oxide | 30% |
| Ammonium Phosphate | 10% |
| Sand | 60% |

Set time is 5 minutes.
Compressive strength at 24 hours is 1,100 psi.

EXAMPLE 10

A test was run wherein the resin and hardener were of approximate equal density in an epoxy formulation. The resin and hardener were poured into a container without premixing, then the aggregate was dropped through the resin and hardener, forming a homogeneous mixture which set into a hardened mass. The formula is given below.

| Substance | Percentage |
| --- | --- |
| Resin: | |
| Dow DER 331 | 13.1% |
| Epoxy Resin | |
| Furfural Alcohol | 3.3% |
| Hardener: | |
| Dow DEH 58 | 3.5% |
| Diethylene Triamine modified with Bisphenol A | |
| E6TPP Borg Warner | 3.5% |
| Triphenyl Phosphate | |
| Sand | 76.6% |
| Set time is 30 minutes. | |
| Compressive strength at 24 hours is 1,500 psi. | |

This test illustrates that various two component thermosetting organic materials can be applied without mixing. Such materials include polyesters, epoxies, polyurethanes and others. According to the invention, the resin and hardener are formulated into portions of substantially similar or identical densities, then poured into place without premixing. Then, the introduction of an additive or filler, such as sand or aggregate, into the poured materials, blends these components to a homogeneous mixture which is capable of curing to a hardened mass.

EXAMPLE 11

A mold in the shape of a block was prepared. The mold was then filled with water. Thereafter, each of the compositions of Examples 2, 3, 5, 6, 8 and 9, respectively, were prepared and poured into the water in the mold until the mold was substantially filled. Excess water was displaced from the mold by the introduction of the dry composition, and if necessary, additional water was added to the top of the filled mold to assure the composition was moist.

Wile it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for molding a cementitious composition into an article having a desired shape or configuration which comprises:

preparing molding means in a predetermined shape or configuration corresponding to the desired shape or configuration of the article;

substantially filling the molding means with water to provide a substantial excess of that needed for hydration of the cementitious composition which is used to make the article;

introducing into the water in the molding means a dry cementitious composition in the form of finely divided particles including at least one cement binder in an amount of greater than 20 percent by weight of the composition and an additive adapted to promote setting or curing of the composition in the presence of the substantial excess of water, the major proportion of the particles having approximately the same drop rate, by pouring the composition into the water without any type of physical mixing of the cementitious composition and the water other than the mixing which occurs when the composition is poured into the water, such that the cementitious composition becomes completely hydrated by combining with a portion of the water and displacing excess water from the molding means; and allowing the hydrated cementitious composition to set or cure to a self supporting solid in the desired shape or configuration.

2. The method of claim 1 wherein the additive adapted to promote setting or curing of the composition in the presence of a substantial excess of water is an accelerator.

3. The method of claim 1 wherein the additive adapted to promote setting or curing of the composition in the presence of a substantial excess of water is a water absorbing compound.

4. A method for molding a cementitious composition into an article having a desired shape or configuration which comprises:

preparing molding means in a predetermined shape or configuration corresponding to the desired shape or configuration of the article;

substantially filling the molding means with water to provide a substantial excess of that needed for hydration of the cementitious composition which is used to make the article;

introducing into the water in the molding means a dry cementitious composition in the form of finely divided particles including at least one cement binder in an amount of greater than 20 percent by weight of the composition and a filler component of sand and aggregate in an amount of less than 80 percent by weight the major proportion of the particles having approximately the same drop rate, by pouring said composition into the water without any type of physical mixing of the cementitious composition and the water other than the mixing which occurs when the composition is poured into the water, such that the cementitious composition becomes completely hydrated by combining with a portion of the water and displacing excess water from the molding means;

allowing the hydrated cementitious composition to set or cure to a self supporting solid in the desired shape or configuration; and removing the set or cured composition from the molding means in the form of the predetermined shape.

5. The method of claim 4 which further comprises dry blending the cementitious composition to a homogeneous consistency prior to pouring the composition into the water; and wherein substantially all the particles have substantially the same drop rate.

6. The method of claim 4 wherein the cement binder is present in an amount of at least 25 percent by weight of the dry cementitious composition and wherein the dry cementitious composition further comprises at least one of an accelerator, foaming agent, blowing agent, water reducing compound, pumping aid, water absorbing compound, waterproofing agent, polymer, wet expansion inhibitor or drying shrinkage inhibitor to impart a specific property to the composition.

7. The method of claim 4 wherein the composition further comprises an amount of the filler component of sand and aggregate to provide a mixture having at least about 35 percent by weight of cement binder; the filler component in the form of particles, the major portion of which have approximately the same drop rate as the cement particles.

8. A method for molding a cementitious composition into an article having a desired shape or configuration which comprises:

preparing molding means in a predetermined shape or configuration corresponding to the desired shape or configuration of the article;

substantially filling the molding means with water to provide a substantial excess of that needed for hydration of the cementitious composition which is used to make the article;

introducing into the water in the molding means a dry cementitious composition in the form of finely divided particles including at least one cement binder in an amount of greater than 20 percent by weight of the composition and a filler component of sand and aggregate in an amount of less than 80 percent by weight, the major proportion of the particles having approximately the same drop rate, by pouring the composition into the water without any type of physical mixing of the cementitious composition and the water other than the mixing which occurs when the composition is poured into the water, such that the cementitious composition becomes completely hydrated by combining with a portion of the water and displacing excess water from the molding means;

allowing the hydrated cementitious composition to set or cure to a self supporting solid in the desired shape or configuration; and removing the molding means to obtain the set or cured composition in the form of the predetermined shape.

9. The method of claim 8 which further comprises dry blending the cementitious composition to a homogeneous consistency prior to pouring the composition into the water; and wherein substantially all the particles have substantially the same drop rate.

10. The method of claim 8 wherein the cement binder is present in an amount of at least 25 percent by weight of the dry cementitious composition and wherein the dry cementitious composition further comprises at least one of an accelerator, foaming agent, blowing agent, water reducing compound, pumping aid, water absorbing compound, waterproofing agent, polymer, wet expansion inhibitor or drying shrinkage inhibitor to impart a specific property to the composition.

11. The method of claim 8 wherein the composition further comprises an amount of the filler component of sand and aggregate to provide a mixture having at least about 35 percent by weight of cement binder; said filler component in the form of particles, the major portion of which have approximately the same drop rate as the cement particles.

12. A method for molding a cementitious composition which comprises:

providing in molding means an amount of water in excess of that needed for hydration of the amount of cementitious composition;

pouring a dry cementitious composition of finely divided particles including at least one cement binder in an amount of at least 20 percent by weight of the composition and a filler component in an amount of less than 80 percent by weight the major proportion of the particles having approximately the same drop rate, into the water without any type of physical mixing of the cementitious composition and the water other than the mixing which occurs when the composition is poured into the water such that the cementitious composition combines with a portion of the water completely hydrate the dry composition while displacing the remainder of the water; and allowing said hydrated cementitious composition to cure to a solid mass.

13. The method of claim 12 wherein the molding means comprises a mold configured to form a predetermined shape and which further comprises removing the set or cured composition from the mold in the form of the predetermined shape.

14. The method of claim 12 wherein the molding means comprises temporary mold means configured to form a predetermined shape and which further comprises removing the temporary mold means to obtain the cured composition if the form of the predetermined shape.

15. The method of claim 12 wherein a gas generating agent is added to the composition so that porous, lightweight articles are obtained.

16. A method for molding a cementitious composition into an article having a desired shape or configuration which comprises:

preparing molding means in a predetermined shape or configuration corresponding to the desired shape or configuration of the article;

substantially filling said molding means with water to provide a substantial excess of that needed for hydration of the cementitious composition which will be used to make the article;

introducing into the water in the molding means a dry cementitious composition in the form of finely divided particles including at least one cement binder in an amount of greater than 20 percent by weight of the composition and a filler component in an amount of less than 80 percent by weight the major proportion of the particles having approximately the same drop rate, by pouring the composition into the water without any type of physical mixing of the cementitious composition and the water other than the mixing which occurs when the composition is poured into the water, such that the cementitious composition becomes competely hydrated by combining with a portion of the water and displacing excess water from the molding means; and allowing the hydrated cementitious composition to set or cure to a self supporting solid in the desired shape or configuration.

17. The method of claim 16 which further comprises dry blending the cementitious composition to a homogeneous consistency prior to pouring the composition into the water.

18. The method of claim 16 wherein the cement binder is present in an amount of at least 25 percent by weight of the dry cementitious composition and wherein the dry cementitious composition further comprises at least one of an accelerator, water reducing compound, pumping aid, water absorbing compound, waterproofing agent, polymer, wet expansion inhibitor or drying shrinkage inhibitor to impart a specific property to the composition.

19. The method of claim 16 wherein the cement binder is Portland cement, gypsum, high alumina cement, magnesium phosphate or a combination thereof, and wherein the filler component is sand or aggregate.

20. The method of claim 16 further comprising adding at least one of an accelerator, water reducing compound, pumping aid, water absorbing compound, waterproofing agent, polymer, wet expansion inhibitor or drying shrinkage inhibitor to impart a specific property to the composition.

21. The method of claim 16 further comprising adding a sufficient amount of addition cement to absorb a portion of the excess water.

22. The method of claim 16 wherein a gas generating agent is added to the composition so that porous, lightweight articles are obtained.

23. The method of claim 16 wherein substantially all the particles have substantially the same drop rate.

24. The method of claim 16 wherein the molding means comprises mold means configured to form a predetermined shape and which further comprises removing the set or cured composition from the mold means in the form of the predetermined shape.

25. The method of claim 16 wherein the molding means comprises temporary mold means configured to form a predetermined shape and which further comprises removing the temporary mold means to obtain the cured composition in the form of the predetermined shape.

26. The method of claim 16 wherein the composition further comprises an amount of the filler component to provide a mixture having at least about 35 percent by weight of cement binder; the filler component in the form of particles, the major portioon of which have approximately the same drop rate as the cement particles.

27. The method of claim 26 wherein a blowing or foaming agent is added to the dry cementitious composition prior to introducing the composition into the water in the molding means so that lightweight shapes or blocks are obtained.

* * * * *

UNITED STATES PATENT AND TRADEMARK OFFICE
CERTIFICATE OF CORRECTION

PATENT NO. : 4,839,115

DATED : June 13, 1989

INVENTOR(S) : H. Nash Babcock and Edward P. Holub

It is certified that error appears in the above-identified patent and that said Letters Patent is hereby corrected as shown below:

At column 5, line 57 after "so", the proper spelling is --forth-- rather than "fourth".

At column 7, line 3 the phrase --(Comparative Example)-- should appear after "EXAMPLE 4".

At column 8, line 42, the proper spelling of the first word is --While--, rather than "Wile".

At column 10, line 67, after "weight" but before "the" (last word), insert --,--.

At column 11, line 6, after "water" but before "completely" (last word), insert --to--.

At column 11, line 42, after "weight" but before "the" (last word), insert --,--.

At column 12, line 25, the antecedent to "cement" is --additional-- rather than "addition".

Signed and Sealed this

Third Day of December, 1991

Attest:

HARRY F. MANBECK, JR.

*Attesting Officer*     *Commissioner of Patents and Trademarks*